(12) United States Patent
Glaze

(10) Patent No.: US 11,203,109 B2
(45) Date of Patent: Dec. 21, 2021

(54) ERGONOMIC COOKTOP SCRAPING UTENSIL

(71) Applicant: H&K International, Mesquite, TX (US)

(72) Inventor: Norman Craig Glaze, Dallas, TX (US)

(73) Assignee: H&K INTERNATIONAL, Mesquite, TX (US)

( * ) Notice: Subject to any disclaimer, the term of this patent is extended or adjusted under 35 U.S.C. 154(b) by 53 days.

(21) Appl. No.: 16/525,288

(22) Filed: Jul. 29, 2019

(65) Prior Publication Data
US 2020/0030960 A1 Jan. 30, 2020

Related U.S. Application Data

(60) Provisional application No. 62/711,295, filed on Jul. 27, 2018.

(51) Int. Cl.
*B25G 1/10* (2006.01)
*A47J 43/28* (2006.01)

(52) U.S. Cl.
CPC ............ *B25G 1/102* (2013.01); *A47J 43/288* (2013.01)

(58) Field of Classification Search
CPC ......... A47L 13/08; A47L 17/06; B44D 3/162; B44D 3/164; B27G 17/04; A47J 43/288; B25G 1/102; B08B 1/005
USPC .... 15/93.1, 143.1, 236.01; D8/10, 101, 107; 30/169, 291, 294, 335–338
See application file for complete search history.

(56) References Cited

U.S. PATENT DOCUMENTS

| | | | | | |
|---|---|---|---|---|---|
| 405,540 | A | * | 6/1889 | Driver | B27G 17/02 30/491 |
| 516,225 | A | * | 3/1894 | Perkins | B44D 3/162 30/171 |
| 540,667 | A | * | 6/1895 | Hunt et al. | B44D 3/162 30/136 |
| 1,200,089 | A | * | 10/1916 | Dooley | B24D 15/066 451/558 |
| 1,807,281 | A | * | 5/1931 | Cross | A46B 5/02 15/145 |
| 2,882,594 | A | * | 4/1959 | Long | B44D 3/162 30/170 |
| 3,934,287 | A | * | 1/1976 | Howard | A63C 11/08 7/158 |
| 4,036,085 | A | * | 7/1977 | Sjostrand | B25D 17/04 81/464 |
| 4,194,852 | A | * | 3/1980 | Cupp | B05C 17/00 15/145 |
| 4,879,871 | A | * | 11/1989 | Kunschke | A01B 1/16 56/239 |

(Continued)

*Primary Examiner* — Ghassem Alie
*Assistant Examiner* — Samuel A Davies

(57) ABSTRACT

An ergonomic cooktop scraping utensil has a planar body, a first side support, a second side support, a blade, and a handle. The blade is removably attached to a distal end of the planar body, and the handle is laterally connected between the upper ends of the first and second side supports. When force is applied to the handle, it is transmitted to the side supports and into both the proximal and distal ends of the utensil. The blade is configured to be oriented at a specified blade angle relative to the cooktop surface for efficient scraping action. The handle is designed to be operated by the heel of the palm of the user in order to minimize any moment arm, and thus strain, applied to the wrist of the user.

14 Claims, 9 Drawing Sheets

(56) References Cited

U.S. PATENT DOCUMENTS

| | | | | |
|---|---|---|---|---|
| 5,018,347 | A * | 5/1991 | Feilen | A01D 34/733 30/335 |
| 5,319,853 | A * | 6/1994 | Schmidt | A47L 13/08 30/151 |
| 5,632,569 | A * | 5/1997 | Szmansky | E01C 19/43 15/235.4 |
| 6,966,094 | B1 * | 11/2005 | Rigakos | A47J 37/0786 15/111 |
| 8,438,687 | B2 * | 5/2013 | Cybulski | A47J 37/0786 15/111 |
| 8,438,688 | B2 * | 5/2013 | Weinberger | A46B 15/0055 15/111 |
| 8,657,384 | B1 * | 2/2014 | Fraley | E21C 25/00 299/36.1 |
| 10,179,349 | B1 * | 1/2019 | Wang | B08B 1/005 |
| 2003/0106569 | A1 * | 6/2003 | Marion | B60S 3/045 134/6 |
| 2004/0148727 | A1 * | 8/2004 | Veltrop | A47L 13/34 15/236.01 |
| 2005/0131435 | A1 * | 6/2005 | Halecki | A61F 9/0133 606/166 |
| 2006/0048328 | A1 * | 3/2006 | McIlree, Sr. | A47J 43/288 15/236.06 |
| 2007/0251099 | A1 * | 11/2007 | Chun | A47J 43/288 30/169 |
| 2012/0023689 | A1 * | 2/2012 | Weinberger | A47J 37/0786 15/111 |
| 2014/0310917 | A1 * | 10/2014 | Harvey | B25G 1/01 16/421 |

* cited by examiner

Current spatula design:
- One point of contact
- Requires rotational force applied at handle to create force at edge of blade New spatula design:
- 2 points of contact provide for direct application of force at edge of blade

ERGONOMIC COOKTOP SCRAPING UTENSIL

The current application claims a priority to the U.S. Provisional Patent application Ser. No. 62/711,295 filed on Jul. 27, 2018. The current application is filed on Jul. 29, 2019, whereas Jul. 27, 2019 and Jul. 28, 2019 were on a weekend.

FIELD OF THE INVENTION

The present invention relates generally to cooking utensils. More particularly, the present invention is an ergonomic cooking utensil with efficient force transfer in scraping actions.

BACKGROUND OF THE INVENTION

In regard to food quality, there is a current problem in which food product, specifically the outside seared layer, sticks to the cooktop surface during the cooking process. As a result, it is difficult to consistently & effectively remove the food product from the cooking surface, as one piece, without fracturing the product. This seared layer, created by a Maillard reaction at the surface, directly impacts the taste and texture of the food product. By retaining the seared surface together with the food product, the flavor and taste of the food product is improved.

Current spatulas and cooking utensils struggle with removing the product, including the seared layer, consistently off the cooktop surface, creating a varying effect on taste & texture of the finished product. Using a traditional spatula design, the operator is required to set the precise, optimal scrape angle (the angle in which the leading edge of the spatula makes with the cooking surface). With the inherent design of the present invention, this scrape angle is automatically configured with the cooking surface.

Current spatulas and cooking utensils struggle to remove multiple food pieces from the grill without using multiple hands and multiple utensils. The "holding deck" in the design of the present invention can hold and store multiple food pieces immediately after being removed from the cooktop while the utensil is simultaneously extracting other food pieces off the cooktop. This may allow for stacking multiple food product items onto the holding deck at once.

Traditional spatulas create strain in the operator's hand/wrist/arm in order to apply force down to the cooking surface. In the design of the invention, the handle design & location allow for a natural, ergonomic hand position, which is in-line with the forces created from the hand, arm, and upper body. Additionally, the invention contains design elements to protect the operator's hand from the surrounding, hot cooking surfaces, such as a hand guard.

Spatulas commonly used today require the need for a separate tool/apparatus to remove the scraper blade from the main body of the spatula. The invention has a unique design in which the operator can remove & re-attach the scraper blade, by hand, without the need for a separate utensil or apparatus.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The invention is a cooking utensil that can be used as a spatula for lifting cooked product off a cooktop or a cooktop cleaning tool which enables the operator to efficiently apply more force onto a cooking surface in an ergonomic fashion. Advantages of the present invention include:

The operator's force is transferred more directly onto the cooking surface via a unique structural design and fixed orientation to provide optimum removal of cooked product.

The operator's hand and wrist are in an optimal biomechanical position, reducing operator fatigue and excess force.

Operation is accomplished with a single hand.

A removable blade configuration that does not require a separate tool to remove or install.

The present invention includes:

A fixed scrape angle that is automatically aligned with the cooking surface to provide the optimum removal of the cooked product from the cooking surface.

A design that provides a natural, ergonomic hand position, which is in-line with the forces created from the hand, arm, and upper body.

The ability to remove multiple pieces of food product from the cooktop and hold/keep/store the food product on the utensil while picking up additional food pieces-all before unloading them to a different location.

A design that allows the user to apply significantly greater downward force onto the cooktop without needing the use of two hands, which is how current utensils on the market are designed.

Removable sharpened blades on the front, leading edge of the utensil which aids in removing the food products from the cooking surface that tend to stick to the work surface—leaving no outside seared layer of the cooked product. (i.e. the seared surface on a piece of meat sticking to a pan).

A unique design in which the operator can remove & re-attach the spatula and cooktop cleaning utensil blades by hand without the need for a separate utensil or apparatus.

Design elements to protect the operator's hand from the surrounding, hot cooking surfaces.

Figure 1:
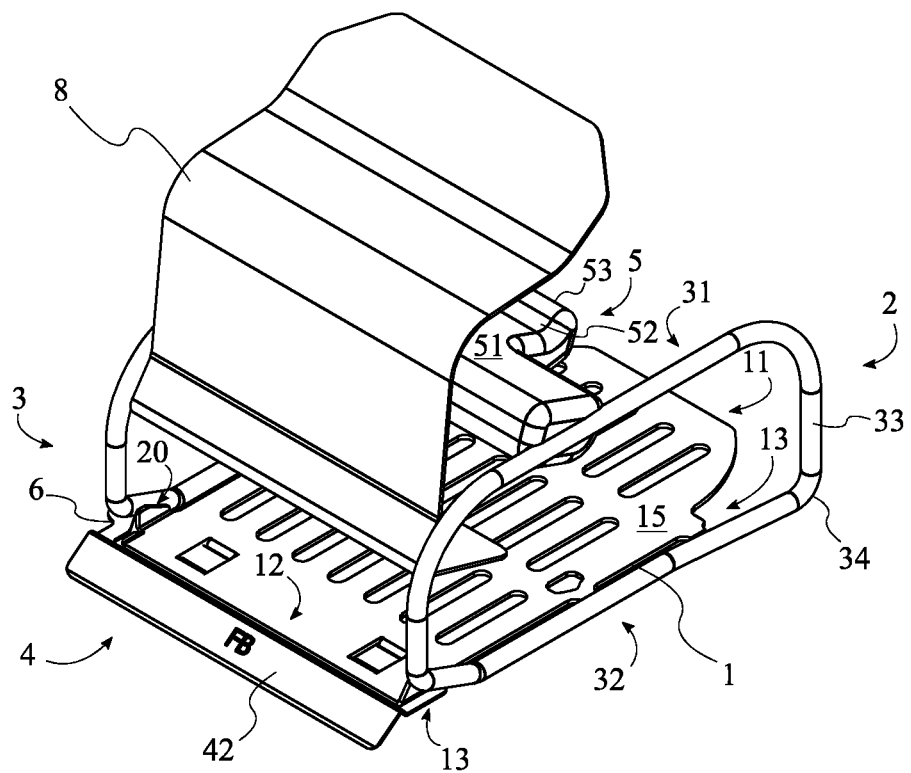
FIG. 1 is an elevated perspective view of the present invention.
Figure 2:
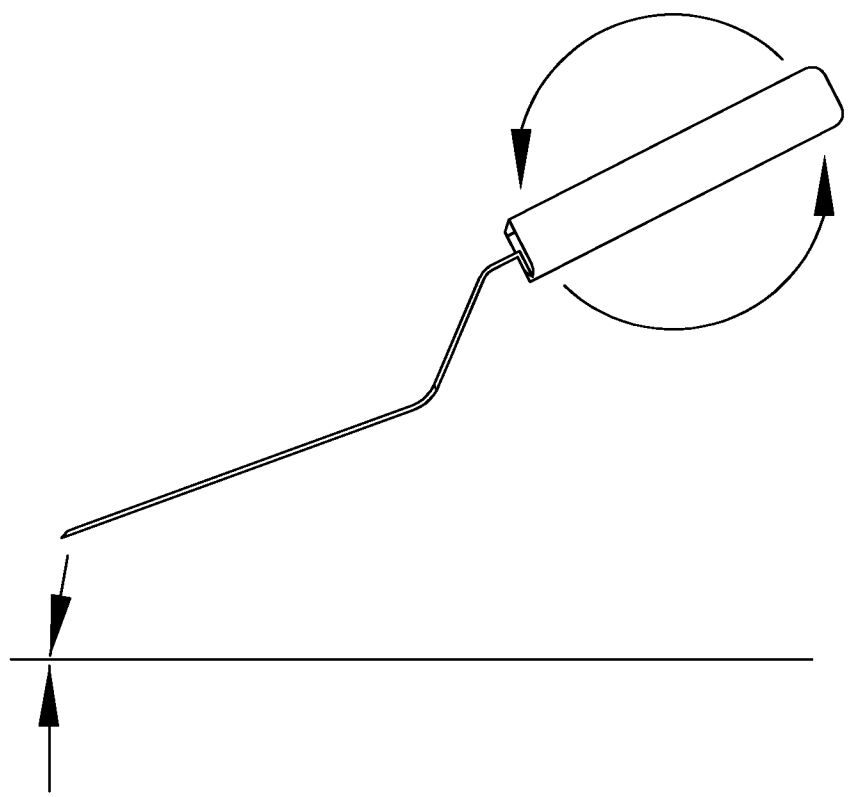
FIG. 2 is an illustration of current typical spatula design.
Figure 3:
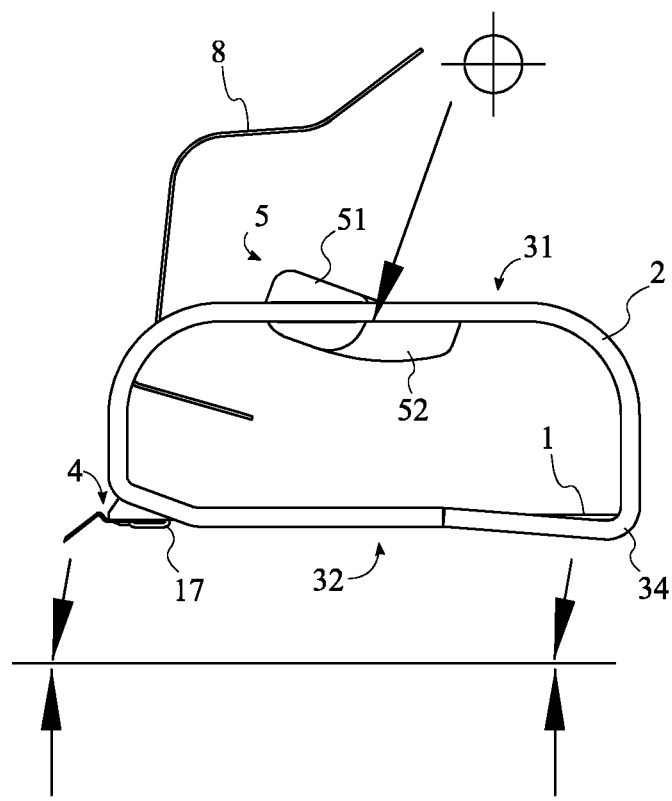
FIG. 3 is a side view of the present invention illustrating the new spatula design of the present invention.

Referring to FIGS. 1-8, in general, the present invention comprises a planar body 1, a first side support 2, a second side support 3, a blade 4, and a handle 5. FIG. 2 illustrates current spatula design, while FIG. 3 illustrates the advantages of the new design of the present invention.

The planar body 1 is a substantially flat body having a bottom surface 16 and a top surface 15 upon which cooked product, for example a hamburger, would rest after being removed by a user from a cooktop 200 using the present invention for transport to a subsequent location for further preparation or serving. The planar body 1 serves as a "holding deck" in the design of the present invention which can hold and store multiple food pieces immediately after being removed from the cooktop 200 while the utensil is simultaneously extracting other food pieces off the cooktop 200.

Figure 7:
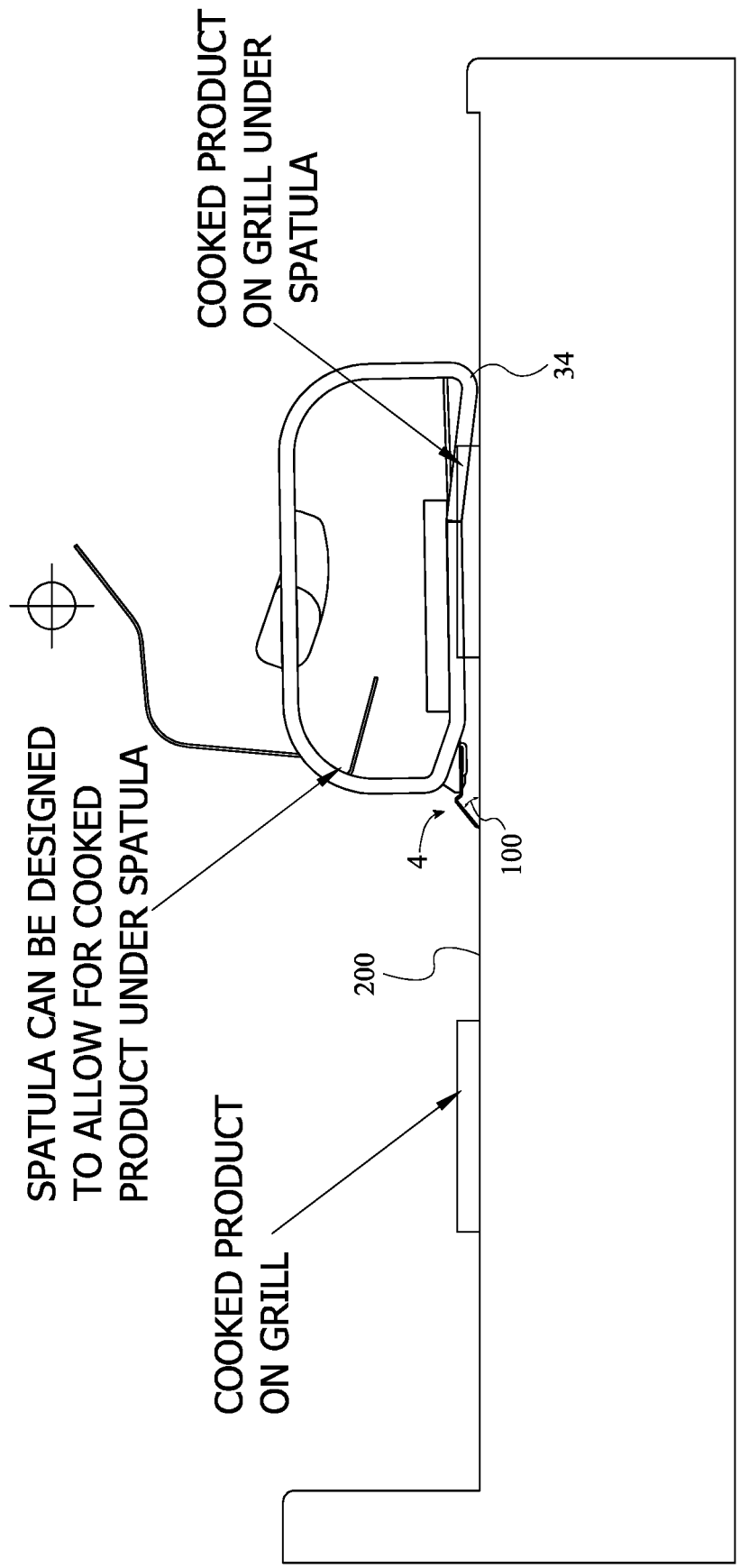
FIG. 7 is an illustration of the present invention in use on a cooktop.
Figure 8:
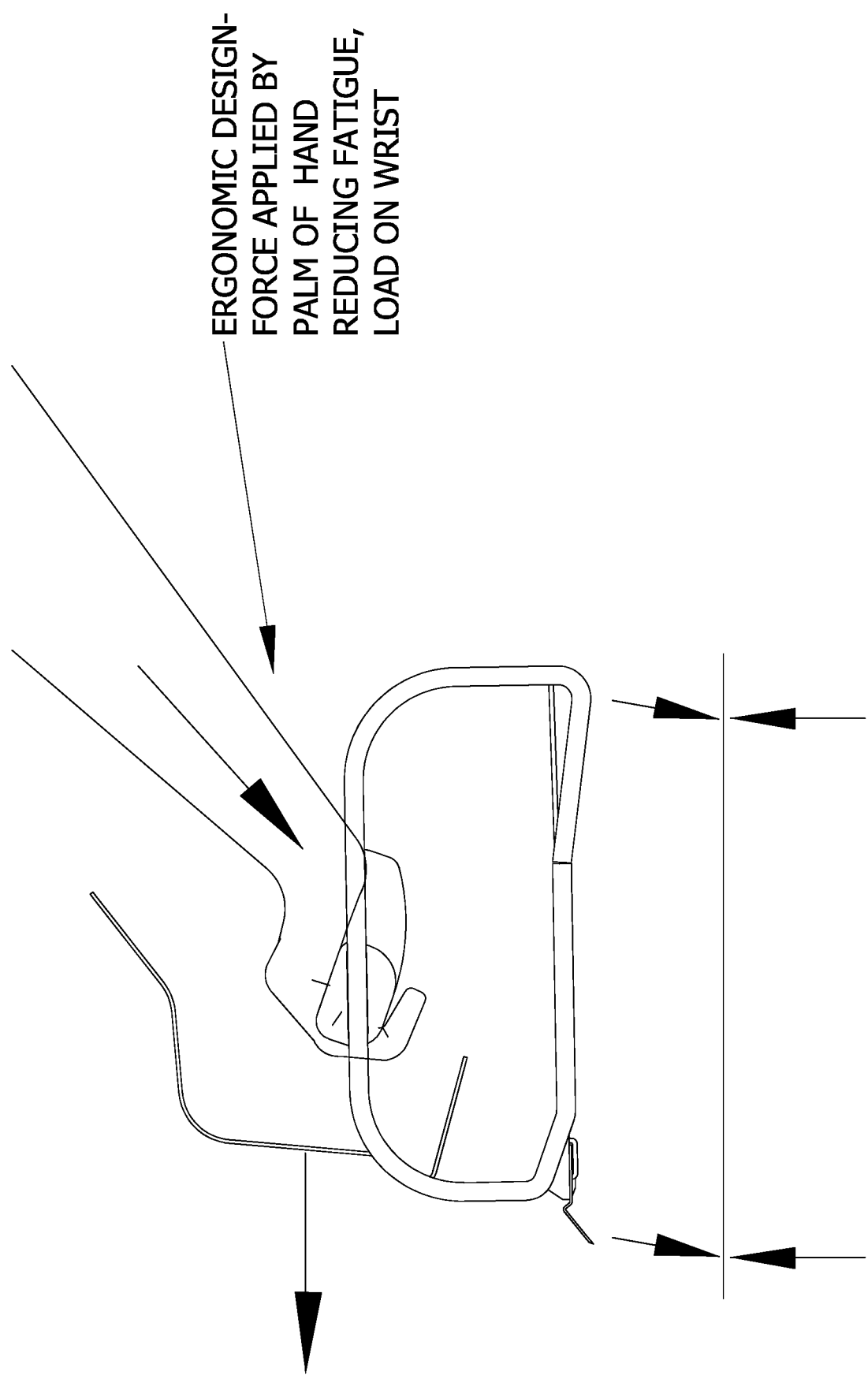
FIG. 8 is an illustration of the ergonomic design of the present invention.

The planar body 1 extends longitudinally between a proximal end 11 and a distal end 12, with the longitudinal direction corresponding generally to the direction a user would displace the present invention along a cooktop 200 in order to pick up cooked product from the cooktop 200, i.e. forward, as illustrated in FIG. 8. In the preferred embodiment of the present invention, the planar body 1 is made of a metal such as, but not limited to, stainless steel, though any other suitable material may be comprised as desired. The blade 4 is removably attached to the distal end 12 of the planar body 1. During use, the user placed the present invention on a cooktop 200 as seen in FIG. 7, and applies force in order to perform a sliding or scraping action along the cooktop 200, during which the blade 4, being in contact with the cooktop 200, removes cooked product or other material present on the cooktop 200, which is gathered onto the planar body 1. It is desired that the angle between the blade 4 and the cooktop 200 be controlled through the geometry of the present invention. To this end, in the preferred embodiment of the present invention, the blade 4 is oriented at a specified blade angle 100 to the planar body 1.

Figure 4:
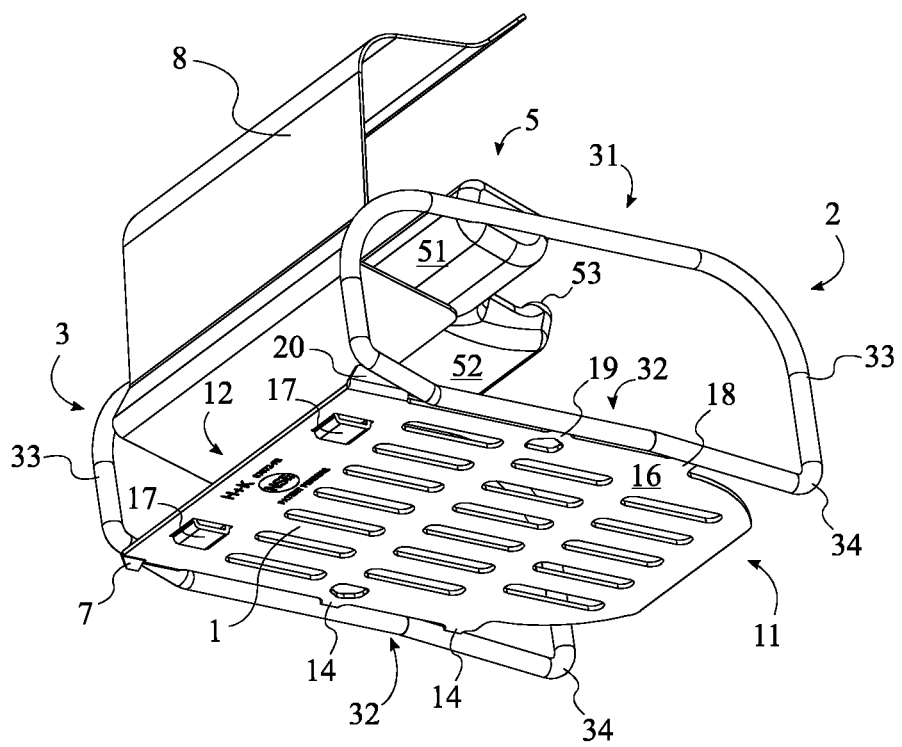
FIG. 4 is a lowered perspective view of the present invention with the blade removed.

Referring to FIGS. 3-4, the first side support 2 and the second side support 3 each comprise an upper (first) end 31 and a lower (second) end 32. The lower end 32 of the first side support 2 is laterally connected to the planar body 1, and the lower end 32 of the second side support 3 is laterally connected to the planar body 1 opposite the first side support 2 along the planar body 1. The first side support 2 and the second side support 3 function to suspend the handle 5 above the planar body 1; as such, the handle 5 is laterally connected between the upper end 31 of the first side support 2 and the upper end 31 of the second side support 3. In the preferred embodiment, the handle 5 is affixed in place. In some embodiments, the handle 5 may be rotatably connected between the first side support 2 and the second side support 3, wherein the handle 5 may be able to pitch about a rotation axis oriented laterally.

The top surface 15 of the planar body 1 is separated from the handle 5 and is positioned between the handle 5 and the bottom surface 16 of the planar body 1. In the preferred embodiment of the present invention, the handle 5 is centrally positioned above the planar body 1 in both the lateral and longitudinal directions, though the specific longitudinal position of the handle 5 may vary in different embodiments. In any case, the handle 5 is suspended above the planar body 1 in order to encourage the force vector applied to the present invention by a user during use to have a substantial downward component, perpendicular to the cooktop 200, as opposed to mainly parallel to the cooktop 200, as is the case with typical existing spatulas.

While it is contemplated that in various embodiments the first side support 2 and the second side support 3 may take any form that facilitates the aforementioned position of the handle 5, in the preferred embodiment, the first side support 2 and the second side support 3 are rail-like structures forming generally rectangular loops.

The first side support 2 and the second side support 3 are oriented longitudinally and parallel to each other, traversing the majority of the length of the lateral sides of the planar body 1, such that the first side support 2 and the second side support 3 are connected adjacent to both the proximal end 11 and the distal end 12 of the planar body 1. Furthermore, in the preferred embodiment the first side support 2 and the second side support 3 are oriented perpendicular to the planar body 1, though in various embodiments the first side support 2 and the second side support 3 may be oriented at different angles to the planar body 1 or are configured in different geometrical arrangements. Moreover, the first side support 2 and the second side support 3 may further comprise at least one medial portion 33 connected between the upper end 31 and the lower end 32 for each of the first side support 2 and the second side support 3. The medial portion is oriented generally vertical, or perpendicular to the planar body 1, while the upper end 31 and the lower end 32 are oriented generally horizontal, or parallel to the planar body 1.

Additionally, in the preferred embodiment, the present invention is intended to have two points of contact with the cooktop 200 during a sliding or scraping action, as illustrated in FIG. 8. A first point of contact is the leading edge of the blade 4. A second point of contact is at the proximal end 11 of the planar body 1. Having two points of contact allows the angle of the blade 4 to be defined with respect to the cooktop 200 while in use. Thus, the first side support 2 and the second side support 3 each comprise a contact point 34, positioned adjacent to the distal end 12 of the planar body 1 at the lower end 32 for each of the first side support 2 and the second side support 3. Alternatively stated, the contact points 34 are located at the rear (proximal) lower corners of the side supports. The bottom surface 16 of the planar body 1 is positioned between the contact point 34 and a top surface 15 of the body; thus, the contact point 34 is below the planar body 1, increasing the angle between the blade 4 and the cooktop 200. It is contemplated, however, that the present invention may in some embodiments comprise proximal contact points 34 not specifically located on the side supports; for example, one or more protrusions connected to the bottom surface 16 of the planar body 1 may serve as the proximal contact points in some embodiments.

Figure 5:
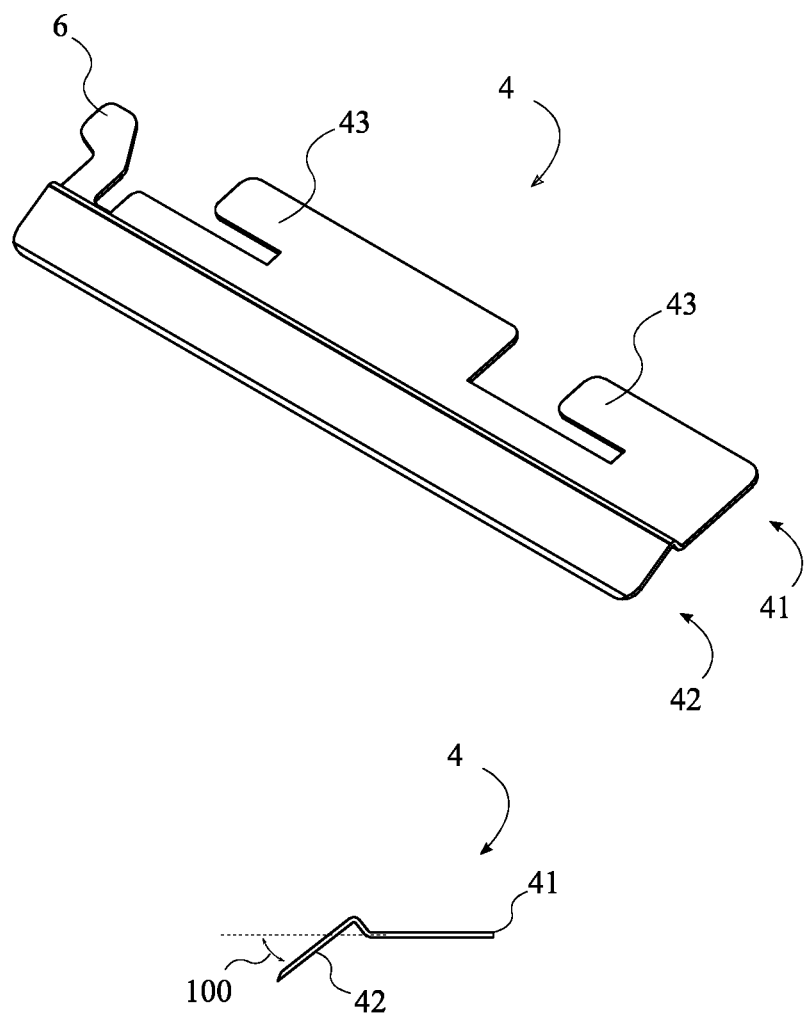
FIG. 5 is a raised perspective view and a side view of the blade of the present invention.

Referring to FIGS. 5 and 7, as previously stated, the blade 4 is oriented at a specified blade angle 100 to the planar body 1, which works in conjunction with the proximal contact point 34 of the side supports to establish a desired blade 4 angle with the cooktop 200 while in use. In one embodiment, the specified blade angle 100 is 38 degrees. In other embodiments, the specified blade angle 100 may vary. In some embodiments, the specified blade angle 100 may exist between a range of 30 degrees to 45 degrees. In other embodiments, the specified blade angle 100 may vary further.

The specific geometric arrangement of the present invention in order to achieve the specified blade angle 100 may vary in different embodiments. In some embodiments, the planar body 1 may comprise a distal portion that is oriented at an angle to the remainder of the planar body 1. In other embodiments, the blade 4 may have two sections at an angle to each other, or the blade 4 may be curved, or other geometric arrangements may be utilized to suit the purpose.

Figure 6:
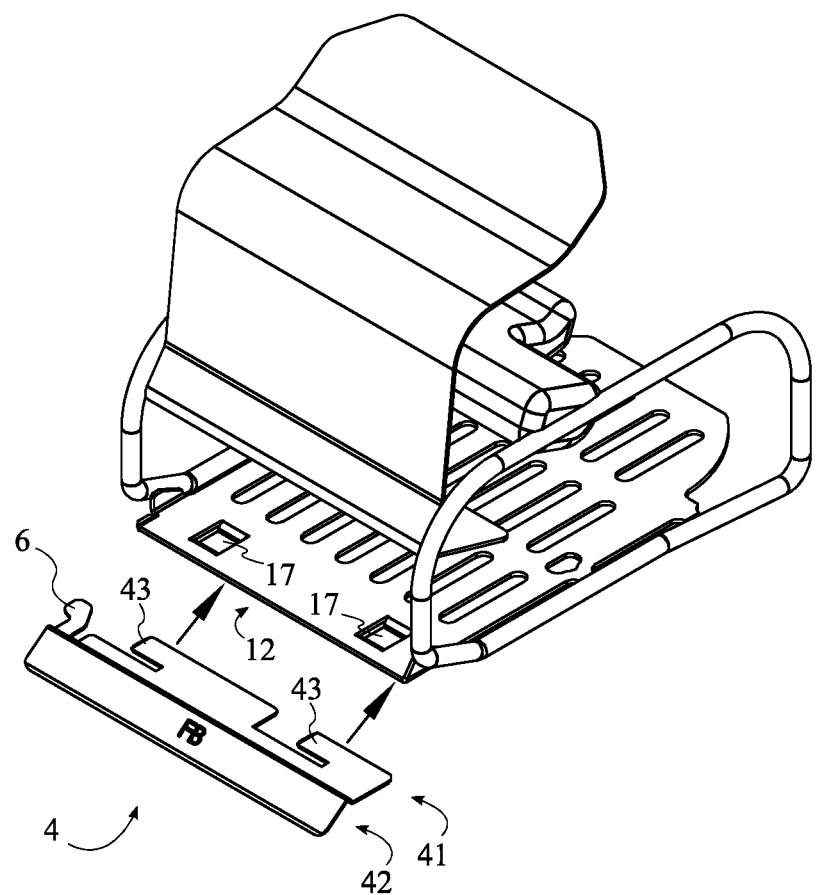
FIG. 6 is an elevated perspective exploded view of the present invention showing the attachment means of the blade to the planar body.

In some embodiments, the blade 4 comprises a mounting portion 41 and a scraping portion 42, as shown in FIGS. 5-6. The mounting portion 41 and the scraping portion 42 are terminally connected to each other and oriented at the specified blade angle 100 to each other, with the mounting portion 41 being removably mounted to the distal end 12 of the planar body 1. Thus, essentially, the blade 4 comprises a bend in order to orient the leading edge of the blade 4 properly.

As previously mentioned, the blade 4 is removably attached to the distal end 12 of the planar body 1 in order to remove the blade 4 for cleaning, maintenance or replacement. National Sanitation Foundation (NSF) requirements dictate that with certain implements that have removable parts, the removably parts are readily removable by an average user without the need for tools or any separate apparatus. The present invention meets this criteria through a tab and slot system.

Referring to FIGS. 4-6, in the preferred embodiment, the mounting portion 41 of the blade 4 comprises a first plurality of mounting members 43, while the planar body 1 further comprises a second plurality of mounting members 17. The second plurality of mounting members 17 is connected to the bottom surface 16 of the planar body 1 adjacent to the distal end 12. The first plurality of mounting members 43 is removably engaged with the second plurality of mounting members 17.

In the preferred embodiment, each of the first plurality of mounting members 43 is a tab, while each of the second plurality of mounting members 17 is a slot. The tabs locate and support the blade 4 relative to the planar body 1 in conjunction with the slots, which are U-shaped offset mounting members extending downward from the bottom surface 16 of the planar body 1.

The tabs and slots are oriented laterally in order to secure the blade 4 against longitudinal forces encountered during use. Though the aforementioned arrangement is disclosed as the preferred embodiment, it should be noted that other configurations may feasibly be realized in order to achieve the purpose of the blade 4 being readily removably from the present invention. In the preferred embodiment, the blade 4 further comprises a release tab 6 that is laterally connected to the mounting portion 41. Moreover, a locking tab 7 is laterally connected to the planar body 1 adjacent to the distal end 12, the locking tab 7 being configured to corresponds to and mate with the release tab 6. The release tab 6 may be removably engaged with the locking tab 7 during installation of the blade 4 in order to securely retain the blade 4 onto the planar body 1. In order to remove the blade 4 for cleaning, maintenance or replacement, the user must simply press on the release tab 6 in order to disengage the release tab 6 from the locking tab 7.

In some embodiments, the present invention may forgo conforming to the aforementioned restriction of ready removability, and the blade 4 may be removably attached to the planar body 1 through other means, such as, but not limited to, fasteners. In some embodiments, the blade 4 may be permanently affixed to the planar body 1.

The specific nature of the connection between the planar body 1 and the side supports may vary in different embodiments. Referring to FIGS. 1 and 4, in some embodiments, the planar body 1 comprises a first plurality of connecting members 13 and a second plurality of connecting members 14. The first plurality of connecting members 13 is connected between the planar body 1 and the lower end 32 of the first side support 2, and the second plurality of connecting members 14 is connected between the planar body 1 and the lower end 32 of the second side support 3.

Furthermore, in some embodiments, the first plurality of connecting members 13 and the second plurality of connecting members 14 each comprise a proximal connecting member 18 and a distal connecting member 20. The proximal connecting member 18 is positioned adjacent to the proximal end 11 of the planar body 1, while the distal connecting member 20 is positioned adjacent to the distal end 12 of the planar body 1. Some embodiments may further comprise at least one medial connecting member 19, positioned between the distal connecting member 20 and the proximal connecting member 18. In some embodiments, the proximal connecting member 18 may be positioned between the at least one medial connecting member 19 and the proximal end 11 of the planar body 1. In some embodiments, alternatively to multiple connecting members, a single connecting member spanning the same or similar longitudinal distance as the connecting members may be comprised, or the side supports may be directly connected to the planar body 1, eliminating the connecting members entirely.

The handle 5 of the present invention is designed to be used in the palm of the user's hand, so that force applied by the user is transferred more directly from their arm through their wrist instead of through further up the hand near or at the fingers, which would create a moment arm that puts strain on the wrist. In the preferred embodiment, the handle 5 comprises a handle body 51 and a trailing portion 52. The handle body 51 is connected between the first side support 2 and the second side support 3, and the trailing portion 52 is terminally connected to the handle body 51, such that the trailing portion 52 is between the handle body 51 and the proximal end 11 of the planar body 1 along the longitudinal direction. The trailing portion 52 is intended to encourage the user to place the lower portion of their palm directly adjacent to their wrist on the handle 5 in order to use the present invention, as opposed to higher on the palm closer to the fingers, which would create more strain on the wrist. The trailing portion 52 may comprise a curve 53, the curve 53 being positioned opposite the handle body 51 along the trailing portion 52, between the distal end 12 of the planar body 1 and the handle body 51, such that the curve 53 is oriented away from the planar body 1. In other embodiments, the curve 53 may be replaced with a feature such as a nub or protrusion in order to place an obstruction adjacent to the handle body 51, making it uncomfortable for the user to place their hand on the handle 5 further up on their palm, as the curve 53 or other protrusion would press into the user's palm. In order to properly use the present invention, the heel of the palm should be placed on the handle 5 adjacent to the curve 53 or nub, ensuring that the direction of force applied is more substantially close to the wrist.

The preferred embodiment of the present invention further comprises a hand guard 8, though the hand guard 8 is not a required feature. The hand guard 8 is laterally connected between the upper end 31 of the first side support 2 and the upper end 31 of the second side support 3 forward of the handle 5, with the hand guard 8 being positioned between the handle 5 and the blade 4. The hand guard 8 is preferably a generally planar element which protects the user's hand from any grease spatter or other potential hazards which may be encountered during use of the present invention.

Figure 9:
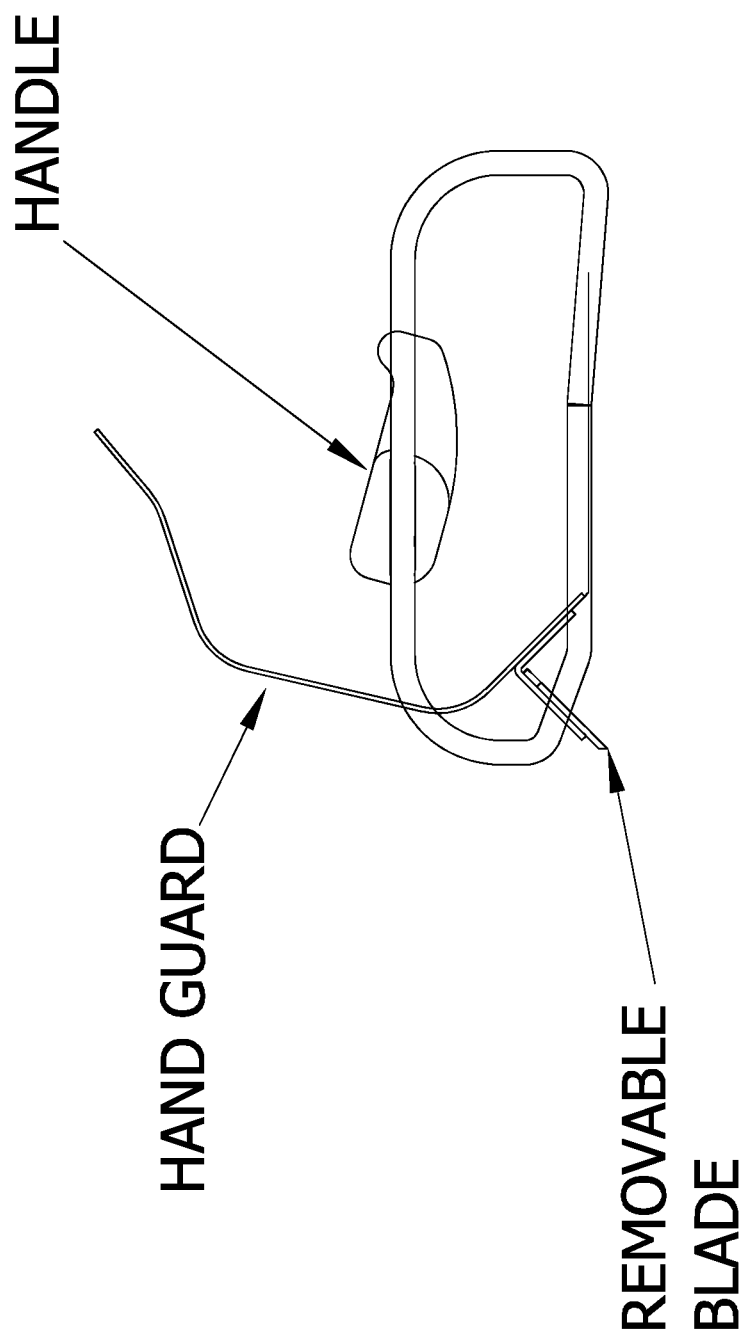
FIG. 9 is an illustration of an alternate embodiment of the present invention configured to be used as a cooktop cleaning tool.

Finally, in an alternate embodiment, the present invention may be configured as a cooktop cleaning tool intended mainly for scraping residue from a cooktop as illustrated in FIG. 9.

Although the invention has been explained in relation to its preferred embodiment, it is to be understood that many other possible modifications and variations can be made without departing from the spirit and scope of the invention as hereinafter claimed.

What is claimed is:

1. An ergonomic cooktop scraping utensil comprising:
a planar body;
a locking tab;
a first side support;
a second side support;
a blade;
a handle;
the planar body extending longitudinally between a proximal end and a distal end thereof and parallelly with a longitudinal direction;
the locking tab being laterally connected to the planar body;
the locking tab being adjacently positioned to the distal end of the planar body;
the blade being removably attached to the distal end of the planar body;
the first side support and the second side support each comprising a first end and a second end opposite the first end;
the second end of the first side support being laterally connected to the planar body;
the second end of the second side support being laterally connected to the planar body opposite the first side support along the planar body;
the handle being laterally connected between the first end of the first side support and the first end of the second side support;
the blade comprising a release tab, a mounting portion and a scraping portion;
the release tab being laterally connected to the mounting portion;
the release tab being removably engaged with the locking tab;
the release tab and the locking tab being configured to allow for installation and removal of the blade without any other tools;
the mounting portion being removably mounted to the distal end of the planar body;
the mounting portion and the scraping portion being terminally connected to each other;
the mounting portion comprising a first plurality of mounting members;
the planar body comprising a first surface, a second surface opposite the first surface and a second plurality of mounting members;
the first surface being positioned between the handle and the second surface;
the second plurality of mounting members being connected to the second surface of the planar body adjacent to the distal end; and
the first plurality of mounting members being configured to be removably engaged with the second plurality of mounting members in parallel with a lateral direction orthogonal to the longitudinal direction when the release tab is disengaged from the locking tab.

2. The ergonomic cooktop scraping utensil as claimed in claim 1 comprising:
the first side support and the second side support being oriented longitudinally and parallel to each other.

3. The ergonomic cooktop scraping utensil as claimed in claim 1 comprising:
the first side support and the second side support being oriented perpendicular to the planar body.

4. The ergonomic cooktop scraping utensil as claimed in claim 1 comprising:
the first side support and the second side support being connected adjacent to the proximal end and the distal end of the planar body.

5. The ergonomic cooktop scraping utensil as claimed in claim 1 comprising:
the first side support and the second side support each further comprising at least one medial portion; and
the at least one medial portion being connected between the first end and the second end for each of the first side support and the second side support.

6. The ergonomic cooktop scraping utensil as claimed in claim 1 comprising:
the planar body comprising a first plurality of connecting members and a second plurality of connecting members;
the first plurality of connecting members being connected between the planar body and the second end of the first side support; and
the second plurality of connecting members being connected between the planar body and the second and of the second side support.

7. The ergonomic cooktop scraping utensil as claimed in claim 6 comprising:
the first plurality of connecting members and the second plurality of connecting members each comprising a proximal connecting member, at least one medial connecting member, and a distal connecting member;
the distal connecting member being positioned adjacent to the distal end of the planar body;
the at least one medial connecting member being positioned between the distal connecting member and the proximal connecting member; and
the proximal connecting member being positioned between the at least one medial connecting member and the proximal end of the planar body.

8. The ergonomic cooktop scraping utensil as claimed in claim 1 comprising:
the blade being oriented at a specified blade angle to the planar body.

9. The ergonomic cooktop scraping utensil as claimed in claim 8 comprising:

the specified blade angle between a range of 30 degrees to 45 degrees.

10. The ergonomic cooktop scraping utensil as claimed in claim 8 comprising:
the specified blade angle being 38 degrees.

11. The ergonomic cooktop scraping utensil as claimed in claim 1 comprising:
the mounting portion and the scraping portion being oriented at the specified blade angle to each other.

12. The ergonomic cooktop scraping utensil as claimed in claim 1 comprising:
the first side support and the second side support each further comprising a contact point; and
the second surface of the planar body being positioned between the contact point and the first surface of the planar body.

13. The ergonomic cooktop scraping utensil as claimed in claim 1 comprising:
the handle comprising a handle body and a trailing portion;
the handle body being connected between the first side support and the second side support;
the trailing portion being terminally connected to the handle body;
the trailing portion comprising a curve;
the curve being positioned opposite the handle body along the trailing portion, between the distal end of the planar body and the handle body; and
the curve being oriented away from the planar body.

14. The ergonomic cooktop scraping utensil as claimed in claim 1 comprising:
a hand guard;
the hand guard being laterally connected between the first end of the first side support and the first end of the second side support; and
the hand guard being positioned between the handle and the blade.

* * * * *